(12) United States Patent
Liu

(10) Patent No.: US 11,222,568 B2
(45) Date of Patent: Jan. 11, 2022

(54) SPLICED DISPLAY DEVICE

(71) Applicant: TCL CHINA STAR OPTOELECTRONICS TECHNOLOGY CO., LTD., Shenzhen (CN)

(72) Inventor: Jinfeng Liu, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/772,598

(22) PCT Filed: May 20, 2020

(86) PCT No.: PCT/CN2020/091296
§ 371 (c)(1),
(2) Date: Jun. 12, 2020

(65) Prior Publication Data
US 2021/0343211 A1 Nov. 4, 2021

(30) Foreign Application Priority Data

Apr. 30, 2020 (CN) .......................... 202010360759.6

(51) Int. Cl.
*G09G 3/20* (2006.01)
*G06F 3/14* (2006.01)

(52) U.S. Cl.
CPC ............. *G09G 3/20* (2013.01); *G06F 3/1438* (2013.01); *G09G 2310/0267* (2013.01); *G09G 2360/04* (2013.01)

(58) Field of Classification Search
CPC ............. G09G 3/20; G09G 2310/0267; G09G 2360/04; G06F 3/1438
See application file for complete search history.

(56) References Cited

U.S. PATENT DOCUMENTS

| 2008/0001906 A1 | 1/2008 | Wang | |
| 2011/0298763 A1* | 12/2011 | Mahajan | G09F 9/3026 345/207 |
| 2019/0018294 A1* | 1/2019 | Shi | G09G 3/364 |

(Continued)

FOREIGN PATENT DOCUMENTS

| CN | 102270445 A | 12/2011 |
| CN | 204242565 U | 4/2015 |
| CN | 105047167 A | 11/2015 |

(Continued)

OTHER PUBLICATIONS

Ebihara, et al. "Liquid crystal display device and its driving method", JP 2007225898 A machine translation (Year: 2007).*

*Primary Examiner* — Peter D McLoone
(74) *Attorney, Agent, or Firm* — The Roy Gross Law Firm, LLC; Roy Gross

(57) ABSTRACT

A spliced display device includes at least two display panels and a driver device configured to drive the display panels. Each of the display panels includes at least two display areas disposed side by side in a first direction. Any adjacent two of the display areas are configured to be scanned in directions facing each other or facing away from each other. The display device is provided with a maximum brightness area or a minimum brightness area located between the adjacent two of the display panels.

6 Claims, 6 Drawing Sheets

(56) References Cited

U.S. PATENT DOCUMENTS

2019/0164994 A1   5/2019   Gan

FOREIGN PATENT DOCUMENTS

| CN | 107357103 A | 11/2017 |
| CN | 107797354 A | 3/2018 |
| CN | 109003584 A | 12/2018 |
| JP | 2007225898 A | 9/2007 |

* cited by examiner

SPLICED DISPLAY DEVICE

BACKGROUND OF INVENTION

1. Field of Invention

The present invention relates to a technical field of displays, and particularly to, a spliced display device.

2. Related Art

With development of large-sized screen televisions, requirements for screen clarity are getting higher and higher, and 8K or higher resolution display panels will certainly become a development trend.

As an increase in size, the panels have longer scan lines and data lines in addition to more pixels. Since general source lines themselves have certain impedance, and as the impedance is away from signal sending ends, resistance and capacitance of panels themselves give rise to more influence on signal delay, resulting in a technical problem of uneven brightness of the panels. For example, grayscale brightness near data signal sending ends of display panels is greater than grayscale brightness away from the data signal sending ends of the display panels. For large-sized display panels, they are generally formed by multiple display panels spliced together. A technical problem of uneven brightness of display panels occurs because of impedance of data lines, so that brightness of adjacent display panels is different, resulting in uneven brightness of spliced display devices.

Therefore, it is imperative to provide a spliced display device to overcome the above-mentioned problem.

SUMMARY OF INVENTION

An object of the present invention is to provide a spliced display device to overcome a technical problem of uneven brightness of conventional spliced display devices.

In order to achieve the above-mentioned object, the present application provides a spliced display device, comprising at least two display panels and a driver device configured to drive the display panels; wherein each of the display panels comprises at least two display areas disposed side by side in a first direction, any adjacent two of the display areas are configured to be scanned in directions facing each other or facing away from each other under control of the driver device, and adjacent two of the display panels provided with display areas spliced together and configured to be scanned in directions opposite to each other; wherein when adjacent two of the display panels receive a same grayscale voltage, the display device is provided with a maximum brightness area or a minimum brightness area located between the adjacent two of the display panels.

In the spliced display device of the present application, the at least two display panels comprise a first display panel and a second display panel, the first display panel at least comprises a first display area and a second display area arranged side by side in the first direction, and the second display panel at least comprises a third display area and a fourth display area arranged side by side in the first direction; wherein the first display area and the third display area are scanned in a direction the same as that of the first direction, and the second display area and the fourth display area are scanned in a direction opposite to the first direction. In the spliced display device of the present application, each one of the display panels comprises 2k scan lines, wherein first to $k^{th}$ scan lines are disposed in a first region provided in the display panel, and $k+1^{th}$ to $2k^{th}$ scan lines are disposed in a second region provided in the display panel; wherein the first region is scanned in a direction from the first to $k^{th}$ scan lines, the second region is scanned in a direction from the $2k^{th}$ to $k+1^{th}$ scan lines, and k is a positive integer; wherein the first region is the first display area of the first display panel or is the third display area of the second display panel, and the second region is the second display area of the first display panel or is the fourth display area of the second display panel.

In the spliced display device of the present application, the driver device comprises a first driver chip configured to control displaying of the first display panel, and a second driver chip configured to control displaying of the second display panel, wherein each of the first driver chip and the second driver chip comprises 2k output channels, and each of the output channels is connected to a corresponding one of the scan lines; wherein the output channels in a first driver area provided in the first driver chip are correspondingly connected to the scan lines in the first display area, the output channels in a second driver area provided in the first driver chip are correspondingly connected to the scan lines in the second display area, the output channels in a third driver area provided in the second driver chip are correspondingly connected to the scan lines in the third display area, and the output channels in a fourth driver area provided in the second driver chip are correspondingly connected to the scan lines in the fourth display area.

In the spliced display device of the present application, the first driver area includes the first to $2k-1^{th}$ odd-numbered output channels in the first driver chip, the second driver area includes $2^{nd}$ to $2k^{th}$ even-numbered output channels in the first driver chip, the third driver area includes first to $2k-1^{th}$ odd-numbered output channels in the second driver chip, and the fourth driver area includes $2^{nd}$ to $2k^{th}$ even-numbered output channels in a second driver chip; wherein the first to $k^{th}$ scan lines in the first display area are correspondingly connected to the first to $2k-1^{th}$ output channels in turn in the first driver chip, the $2k^{th}$ to $k+1^{th}$ scan lines in the second display area are correspondingly connected to the $2^{nd}$ to $2k^{th}$ output channels in turn in the second driver chip, the first to $k^{th}$ scan lines in the third display area are correspondingly connected to the first to $2k-1^{th}$ output channels in turn in the third driver chip, and the $2k^{th}$ to $k+1^{th}$ scan lines in the fourth display area are correspondingly connected to the $2^{nd}$ to $2k^{th}$ output channels in turn in the fourth driver chip.

In the spliced display device of the present application, each of the first driver chip and the second driver chip comprises k output terminals, and each of the output terminals comprises two of the output channels; wherein the $2k-1^{th}$ output channels in the first driver area and the $2k^{th}$ output channels in the second driver area are electrically connected to $k^{th}$ output terminals in the first driver chip, and the $2k-1^{th}$ output channels in the third driver area and the $2k^{th}$ output channels in the fourth driver area are electrically connected to $k^{th}$ output terminals in the second driver chip.

In the spliced display device of the present application, the display panel further comprises a plurality of first switches disposed on the first to $k^{th}$ scan lines, and a plurality of second switches disposed on $k+1^{th}$ to $2k^{th}$ scan lines of the first display panel and the second display panel; wherein when a scan signal is output from an $n^{th}$ terminal to a corresponding one of the scan lines, one of the first switches corresponding to the $n^{th}$ terminal is closed, and one of the second switches corresponding to the $n^{th}$ terminal is open, wherein $n^{th}$ scan lines of the first display panel and the second display panel receive the scan signals, and $2k+1-n^{th}$ scan lines are in a non-operation state; wherein after a predetermined period of time, the one of the first switches corresponding to the $n^{th}$ terminal is open, and the one of the second switches is closed, wherein the $n^{th}$ scan lines of the first display panel and the second display panel are in the non-operation state, and the $2k+1-n^{th}$ scan lines receive the scan signals, wherein $1 \leq n \leq k$, and n is a positive integer.

In the spliced display device of the present application, the first driver area includes the first to $k^{th}$ output channels in the first driver chip, the second driver area includes $k+1^{th}$ to $2k^{th}$ output channels in the first driver chip, the third driver area includes first to $k^{th}$ output channels in the second driver chip, and the fourth driver area includes $k+1^{th}$ to $2k^{th}$ output channels in a second driver chip; wherein the first to $k^{th}$ scan lines in the first display area are electrically connected to the first to $k^{th}$ output channels in turn in the first driver area, the $k+1^{th}$ to $2k^{th}$ scan lines in the second display area are electrically connected to the $k+1^{th}$ to $2k^{th}$ output channels in turn in the second driver area, the first to $k^{th}$ scan lines in the third display area are electrically connected to the first to $k^{th}$ output channels in turn in the third driver area, and the $k+1^{th}$ to $2k^{th}$ scan lines in the fourth display area are electrically connected to the $k+1^{th}$ to $2k^{th}$ output channels in turn in the fourth driver area; wherein the display panel is configured to output first scan signals to the first to $k^{th}$ output channels in the first driver chip and the second driver chip, and to concurrently output second scan signals to the 2k to $k+1^{th}$ output channels in the first driver chip and the second driver chip.

In the spliced display device of the present application, the driver device comprises a first driver chip configured to control displaying of the first display panel and the second display panel, wherein the first driver chip comprises 2k output terminals, and each of the output terminals is connected to corresponding two of the scan lines; wherein the output terminals in a first driver area provided in the first driver chip are correspondingly connected to the scan lines in the first display area and the third display area, and the output terminals in a second driver area provided in the first driver chip are correspondingly connected to the scan lines in the second display area and the fourth display panel.

In the spliced display device of the present application, the first to $k^{th}$ scan lines in the first display area are correspondingly connected to the first to $2k-1^{th}$ output terminals in turn in the first driver area, the $2k^{th}$ to $k+1^{th}$ scan lines in the second display area are correspondingly connected to the $2^{nd}$ to $2k^{th}$ output terminals in turn in the second driver area, the first to $k^{th}$ scan lines in the third display area are correspondingly connected to the first to $2k-1^{th}$ output terminals in turn in the first driver area, and the $2k^{th}$ to $k+1^{th}$ scan lines in the fourth display area are correspondingly connected to the $2^{nd}$ to $2k^{th}$ output terminals in turn in the second driver area.

The present application further provides a spliced display device, comprising at least two display panels and a driver device configured to drive the display panels; wherein each of the display panels comprises at least two display areas disposed side by side in a first direction, any adjacent two of the display areas are configured to be scanned in directions facing each other or facing away from each other under control of the driver device, and adjacent two of the display panels provided with display areas spliced together and configured to be scanned in directions opposite to each other, and the first direction is parallel with a plurality of data lines provided in the display panel; wherein when adjacent two of the display panels receive a same grayscale voltage, the display device is provided with a maximum brightness area or a minimum brightness area located between the adjacent two of the display panels.

In the spliced display device of the present application, the at least two display panels comprise a first display panel and a second display panel, the first display panel at least comprises a first display area and a second display area arranged side by side in the first direction, and the second display panel at least comprises a third display area and a fourth display area arranged side by side in the first direction; wherein the first display area and the third display area are scanned in a direction the same as that of the first direction, and the second display area and the fourth display area are scanned in a direction opposite to the first direction.

In the spliced display device of the present application, each one of the display panels comprises 2k scan lines, wherein first to $k^{th}$ scan lines are disposed in a first region provided in the display panel, and $k+1^{th}$ to $2k^{th}$ scan lines are disposed in a second region provided in the display panel; wherein the first region is scanned in a direction from the first to $k^{th}$ scan lines, the second region is scanned in a direction from the $2k^{th}$ to $k+1^{th}$ scan lines, and k is a positive integer; wherein the first region is the first display area of the first display panel or is the third display area of the second display panel, and the second region is the second display area of the first display panel or is the fourth display area of the second display panel.

In the spliced display device of the present application, the driver device comprises a first driver chip configured to control displaying of the first display panel, and a second driver chip configured to control displaying of the second display panel, wherein each of the first driver chip and the second driver chip comprises 2k output channels, and each of the output channels is connected to a corresponding one of the scan lines; wherein the output channels in a first driver area provided in the first driver chip are correspondingly connected to the scan lines in the first display area, the output channels in a second driver area provided in the first driver chip are correspondingly connected to the scan lines in the second display area, the output channels in a third driver area provided in the second driver chip are correspondingly connected to the scan lines in the third display area, and the output channels in a fourth driver area provided in the second driver chip are correspondingly connected to the scan lines in the fourth display area.

In the spliced display device of the present application, the first driver area includes the first to $2k-1^{th}$ odd-numbered output channels in the first driver chip, the second driver area includes $2^{nd}$ to $2k^{th}$ even-numbered output channels in the first driver chip, the third driver area includes first to $2k-1^{th}$ odd-numbered output channels in the second driver chip, and the fourth driver area includes $2^{nd}$ to $2k^{th}$ even-numbered output channels in a second driver chip; wherein the first to $k^{th}$ scan lines in the first display area are correspondingly connected to the first to $2k-1^{th}$ output channels in turn in the first driver area, the $2k^{th}$ to $k+1^{th}$ scan lines in the second display area are correspondingly connected to the $2^{nd}$ to $2k^{th}$ output channels in turn in the second driver area, the first to $k^{th}$ scan lines in the third display area are correspondingly connected to the first to $2k-1^{th}$ output channels in turn in the third driver area, and the $2k^{th}$ to $k+1^{th}$ scan lines in the fourth display area are correspondingly connected to the $2^{nd}$ to $2k^{th}$ output channels in turn in the fourth driver area.

In the spliced display device of the present application, each of the first driver chip and the second driver chip comprises k output terminals, and each of the output terminals comprises two of the output channels; wherein the $2k-1^{th}$ output channels in the first driver area and the $2k^{th}$ output channels in the second driver area are electrically connected to $k^{th}$ output terminals in the first driver chip, and the $2k-1^{th}$ output channels in the third driver area and the $2k^{th}$ output channels in the fourth driver area are electrically connected to $k^{th}$ output terminals in the second driver chip.

In the spliced display device of the present application, the display panel further comprises a plurality of first switches disposed on the first to $k^{th}$ scan lines, and a plurality of second switches disposed on $k+1^{th}$ to $2k^{th}$ scan lines of the first display panel and the second display panel; wherein when a scan signal is output from an $n^{th}$ terminal to a corresponding one of the scan lines, one of the first switches corresponding to the $n^{th}$ terminal is closed, and one of the second switches corresponding to the $n^{th}$ terminal is open, wherein an $n^{th}$ scan line receives the scan signal, and an $2k+1-n^{th}$ scan line is in a non-operation state; wherein after a predetermined period of time, the one of the first switches corresponding to the $n^{th}$ terminal is open, and the one of the second switches is closed, wherein the $n^{th}$ scan lines of the first display panel and the second display panel are in the non-operation state, and the $2k+1-n^{th}$ scan line receives a scan signal, wherein $1 \leq n \leq k$, and n is a positive integer.

In the spliced display device of the present application, the first driver area includes the first to $k^{th}$ output channels in the first driver chip, the second driver area includes $k+1^{th}$ to $2k^{th}$ output channels in the first driver chip, the third driver area includes first to $k^{th}$ output channels in the second driver chip, and the fourth driver area includes $k+1^{th}$ to $2k^{th}$ output channels in a second driver chip; wherein the first to $k^{th}$ scan lines in the first display area are electrically connected to the first to $k^{th}$ output channels in turn in the first driver chip, the $k+1^{th}$ to $2k^{th}$ scan lines in the second display area are electrically connected to the $k+1^{th}$ to $2k^{th}$ output channels in turn in the second driver chip, the first to $k^{th}$ scan lines in the third display area are electrically connected to the first to $k^{th}$ output channels in turn in the third driver chip, and the $k+1^{th}$ to $2k^{th}$ scan lines in the fourth display area are electrically connected to the $k+1^{th}$ to $2k^{th}$ output channels in turn in the fourth driver chip; wherein the display panel is configured to output first scan signals to the first to $k^{th}$ output channels in the first driver chip and the second driver chip, and to concurrently output second scan signals to the $2k$ to $k+1^{th}$ output channels in the first driver chip and the second driver chip.

In the spliced display device of the present application, the driver device comprises a first driver chip configured to control displaying of the first display panel and the second display panel, wherein the first driver chip comprises $2k$ output terminals, and each of the output terminals is connected to corresponding two of the scan lines; wherein the output terminals in a first driver area provided in the first driver chip are correspondingly connected to the scan lines in the first display area and the third display area, and the output terminals in a second driver area provided in the first driver chip are correspondingly connected to the scan lines in the second display area and the fourth display panel.

In the spliced display device of the present application, the first to $k^{th}$ scan lines in the first display area are correspondingly connected to the first to $2k-1^{th}$ output terminals in turn in the first driver area, the $2k^{th}$ to $k+1^{th}$ scan lines in the second display area are correspondingly connected to the $2^{nd}$ to $2k^{th}$ output terminals in turn in the second driver area, the first to $k^{th}$ scan lines in the third display area are correspondingly connected to the first to $2k-1^{th}$ output terminals in turn in the first driver area, and the $2k^{th}$ to $k+1^{th}$ scan lines in the fourth display area are correspondingly connected to the $2^{nd}$ to $2k^{th}$ output terminals in turn in the second driver area.

The present application has advantageous effects as follows: the present application uses the driver device to control any adjacent two of the display areas to be scanned in directions facing each other or facing away from each other, so that adjacent two of the display areas of the display panels spliced together can be scanned in directions opposite to each other, and when the adjacent two display panels receive a same grayscale voltage, the display device has a maximum brightness area or a minimum brightness area located between the adjacent two of the display panels, thereby preventing brightness difference from occurring between adjoining areas of the adjacent two display panels, and improving brightness uniformity of the spliced display device.

DESCRIPTION OF PREFERRED EMBODIMENTS

In order to make the purpose, technical solutions, and effects of the present application clearer and clearer, the present application will be described in further detail with reference to the accompanying drawings and examples. It should be understood that the specific embodiments described herein are only used to explain the present application, and are not used to limit the present application.

Current large-sized display panels are generally formed by multiple display panels spliced together. A technical problem of uneven brightness of the panels occurs because of impedance of data lines in each display panel, so that brightness of adjacent display panels is different, resulting in a technical problem of uneven brightness of spliced display devices. The present application provides a spliced display device to overcome the above-mentioned problem. Detailed solutions are described below.

Please refer to FIGS. 1-6. A spliced display device 100 includes at least two display panels and a driver device 30 configured to drive the display panels.

Each of the display panels includes at least two display areas disposed side by side in a first direction. Any adjacent two of the display areas are configured to be scanned in directions facing each other or facing away from each other under control of the driver device 30. Adjacent two of the display panels provided with display areas spliced together and configured to be scanned in directions opposite to each other.

Specifically, when adjacent two of the display panels receive a same grayscale voltage, the display device 100 is provided with a maximum brightness area or a minimum brightness area located between the adjacent two of the display panels.

The present application provides the driver device 30 to control any adjacent two of the display areas to be scanned in directions facing each other or facing away from each other, so that adjacent two of the display areas of the display panels spliced together are scanned in directions opposite to each other, and when the adjacent two display panels receive a same grayscale voltage, the display device 100 is provided with a maximum brightness area or a minimum brightness area located between the adjacent two of the display panels, thereby brightness difference between adjoining areas of adjacent two display panels can be prevented, and brightness uniformity of the spliced display device 100 is improved.

The technical solution of the present application will now be described in conjunction with specific embodiments.

Figure 1:
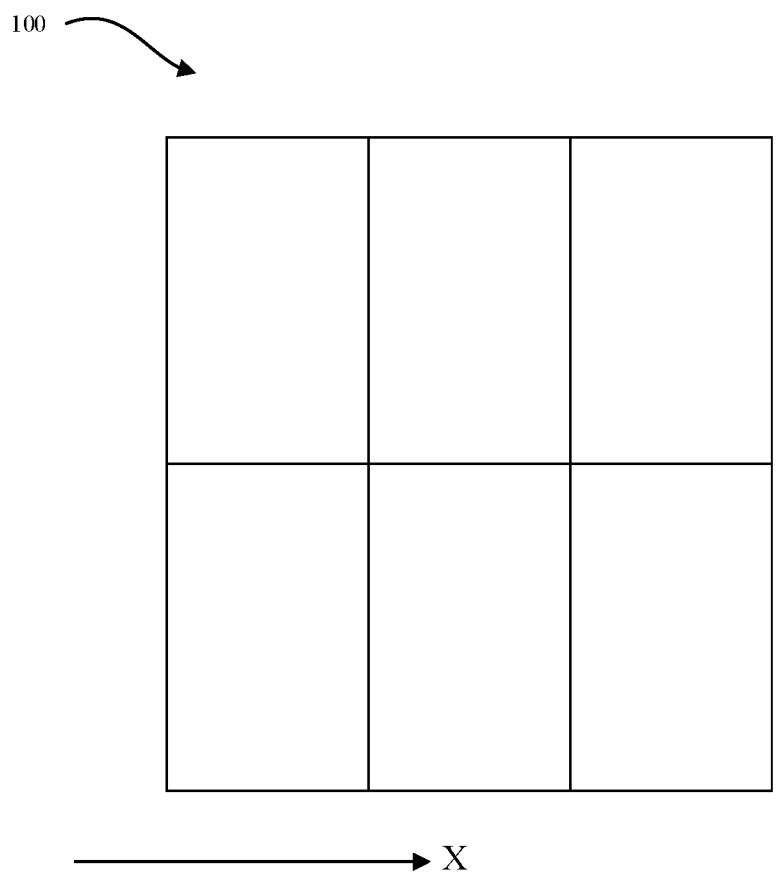
FIG. 1 is a schematic view of a spliced display device of the present application.

According to the spliced display device 100 of an embodiment, the spliced display device may at least include a first display panel 10 and a second display panel 20. As shown in FIG. 1, the spliced display device 100 is composed of four display panels. In order to facilitate description, two display panels are used as an example in this embodiment.

Figure 2:
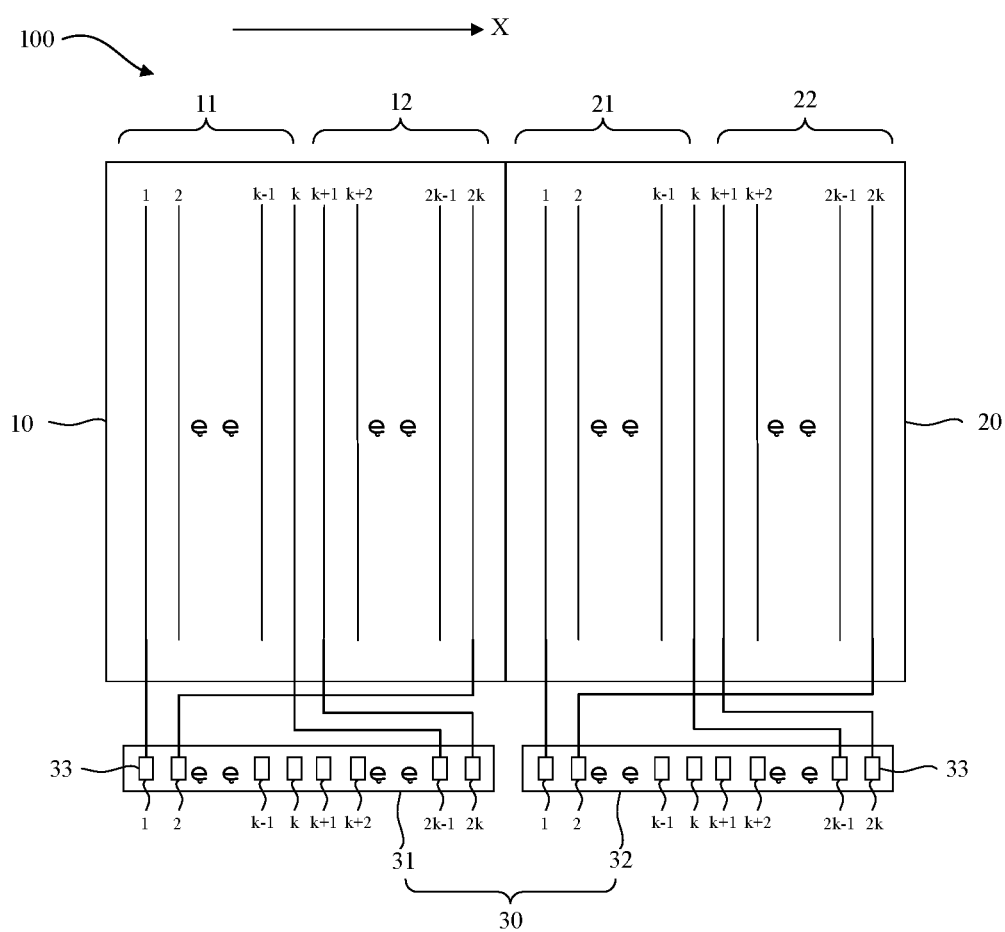
FIG. 2 is a structural view of a first type of a spliced display device of the present application.

Please refer to FIG. 2. The first display panel 10 at least includes a first display area 11 and a second display area 12 arranged side by side in the first direction X. The second display panel 20 at least includes a third display area 21 and a fourth display area 22 arranged side by side in the first direction X. The first display area 11 and the third display area 21 are scanned in a direction the same as the first direction X, and the second display area 12 and the fourth display area 22 are scanned in a direction opposite to the first direction X.

In this embodiment, the first direction X is parallel with data lines of each one of the display panels. As shown in FIGS. 2-6, vertical lines are scan lines of the application.

In this embodiment, each of the display panel includes 2K scan lines. A first to $k^{th}$ scan lines are disposed in a first region provided in the display panel, and $k+1^{th}$ to $2k^{th}$ scan lines are disposed in a second region provided in the display panel.

The first region is scanned in a direction from the first to $k^{th}$ scan lines, the second region is scanned in a direction from the $2k^{th}$ to $k+1^{th}$ scan lines, and k is a positive integer.

Specifically, the first region is the first display area 11 of the first display panel 10 or is the third display area 21 of the second display panel 20, and the second region is the second display area 12 of the first display panel 10 or is the fourth display area 22 of the second display panel 20.

In this embodiment, any one of the display panels may include a plurality of display areas arranged in the first direction X. For example, each of the first display panel 10 and the second display panel 20 as shown in FIG. 2 is provided with two display regions.

In this embodiment, the driver device 30 at least includes a first driver chip 31 configured to control displaying of at least one of the display panels. The first driver chip 31 includes 2k output channels, and each of the output channels is connected to a corresponding one of the scan lines.

Specifically, the output channels in a first driver area provided in the first driver chip 31 are correspondingly connected to the scan lines in the first region. The output channels in a second driver area provided in the first driver chip 31 are correspondingly connected to the scan lines in the second region.

Please refer to FIG. 2. The first driver chip 31 is configured to control displaying of the first display panel 10. The output channels of the first driver chip 31 are only connected to the scan lines of the first display panel 10.

In this embodiment, the first driver area includes the first to $2k-1^{th}$ odd-numbered output channels in the first driver chip 31, and the second driver area includes $2^{nd}$ to $2k^{th}$ even-numbered output channels in the first driver chip 31.

In this embodiment, the first to $k^{th}$ scan lines in the first display area 11 are correspondingly connected to the first to $2k-1^{th}$ output channels in turn in the first driver chip, and the $2k^{th}$ to $k+1^{th}$ scan lines in the second display area 12 are correspondingly connected to the $2^{nd}$ to $2k^{th}$ output channels in turn in the second driver chip.

In this embodiment, each of the output channels is connected to a corresponding one of output terminals 33 of the first driver chip 31.

Please refer to FIG. 2. The driver device 30 further includes a second driver chip 32. The first driver chip 31 is configured to control displaying of the first display panel 10, and the second driver chip 32 is configured to control displaying of the second display panel 20.

In this embodiment, the second driver chip 32 is provided with a third driver area corresponding to the third display area 21 of the second display panel 20, and the second driver chip 32 is provided with a fourth driver area corresponding to the fourth display area 22 of the second display panel 20.

Please refer to FIG. 2. Each of the first driver chip 31 and the second driver chip 32 includes 2k output channels, and each of the output channels is connected to a corresponding one of the output terminals 33 of the driver device 30. For example, in the first driver chip 31, odd-numbered output channels are connected to the scan lines in the first display area 11 of the first display panel 10, and even-numbered output channels are connected to the scan lines in the second display area 12 of the first display panel 10. In the second driver chip 32, odd-numbered output channels are connected to the scan lines in the third display area 21 of the second display panel 20, and even-numbered output channels are connected to the scan lines in the fourth display area 22 of the second display panel 20. The following takes the first driving chip 31 as an example for description:

In the first driver area of the first driver chip 31, a first output channel is correspondingly connected to a first scan line in the first display area 11, a third output channel is correspondingly connected to a second scan line in the first display area 11, and a fifth output channel is correspondingly connected to a third scan line in the first display area 11. According to associated relations of connection, a $2k-1^{th}$ output channel is correspondingly connected to a $k^{th}$ scan line in the first display area 11.

In the second driver area of the first driver chip 31, a second output channel is correspondingly connected to a $2k^{th}$ scan line in the second display area 12, a fourth output channel is correspondingly connected to a $2k-1^{th}$ scan line in the second display area 12, and a sixth output channel is correspondingly connected to a $2k-2^{nd}$ scan line in the second display area 12. According to associated relations of connection, a $2k^{th}$ output channel is correspondingly connected to a $k+1^{th}$ scan line in the second display area 12, wherein a $k+1^{th}$ scan line in the second display area 12 is corresponding to a first scan line in the second display area 12, and the $2k^{th}$ scan line in the second display area 12 is corresponding to a last scan line in the second display area 12.

In the third driver area of the second driver chip 32, a first output channel is correspondingly connected to a first scan line in the third display area 21, a third output channel is correspondingly connected to a second scan line in the third display area 21, and a fifth output channel is correspondingly connected to a third scan line in the third display area 21. According to associated relations of connection, a $2k-1^{th}$ output channel is correspondingly connected to a $k^{th}$ scan line in the third display area 21.

In the fourth driver area of the second driver chip 32, a second output channel is correspondingly connected to a $2k^{th}$ scan line in the fourth display area 22, a fourth output channel is correspondingly connected to a $2k-1^{th}$ scan line in the fourth display area 22, and a sixth output channel is correspondingly connected to a $2k-2^{nd}$ scan line in the fourth display area 22. According to associated relations of connection, a $2k^{th}$ output channel is correspondingly connected to a $k+1^{th}$ scan line in the fourth display area 22, wherein a $k+1^{th}$ scan line in the fourth display area 22 is corresponding to a first scan line in the fourth display area 22, and the $2k^{th}$ scan line in the fourth display area 22 is corresponding to a last scan line in the fourth display area 22.

In the first driver chip 31 and the second driver chip 32, the first to $2k^{th}$ output channels of each of the first driver chip 31 and the second driver chip 32 receives scan signals in turn. Therefore, the first scan line in each of the first display area 11 and the third display area 21 receives scan signals first, then the $2k^{th}$ scan line in each of the second display area 12 and the fourth display area 22 receives scan signals, then the second scan line in each of the first display area 11 and the third display area 21 receives scan signals, and then the $2k-1^{th}$ scan line in each of the second display area 12 and the fourth display area 22 receives scan signals, and so on. Thereby, the first display area 11 and the third display area 13 are scanned in directions facing of facing away from a scan direction of the second display area 12 and the fourth display area 22.

According to the scanning method as described above, subpixels connected to the first scan lines in the first display are 11 and the third display area 21, and subpixels connected to the $2k^{th}$ scan lines in the second display area 12 and the fourth display area 22 have maximum brightness. Subpixels connected to the $k^{th}$ scan lines in the first display are 11 and the third display area 21, and subpixels connected to the $k+1^{th}$ scan lines in the second display area 12 and the fourth display area 22 have minimum brightness. Therefore, brightness of the first display area 11, the second display area 12, the third display area 21, or the fourth display area 22 of the present application gradually decreases first, then gradually increases, then gradually decreases, and finally gradually increases, wherein brightness corresponding to an adjoining area of adjacent two of the display areas is minimum or maximum.

In prior art, due to impedance presented in each of the display panels, when transmitting scan signals, a voltage of a scan signal applied to a signal line first receiving the scan signal is the same as a voltage of a signal output by a driver chip. Because there are more scan lines in the display panels, for example, a conventional display panel with a resolution of 1080P includes 1080 scan signal lines, as subsequent scan signal lines sequentially receive scan signals from the driver chip, voltage lost by the scan signals in the signal lines due to impedance is getting larger and larger. Therefore, the voltage of the scan signal actually transmitted to corresponding scan lines is gradually reduced, resulting in a brightness value of a corresponding column subpixel being lower than a preset value. In the above-mentioned embodiments of the present application, the scan lines corresponding to the display areas in each of the display panels are connected in series to control any adjacent two of the display areas to be scanned in directions facing or facing away from each other. That is, scan lines in adjoining areas of any adjacent two display panels concurrently receive scan signals, so that the adjoining areas between the adjacent two display panels have maximum brightness or minimum brightness of the display device, thereby brightness difference between adjoining areas of adjacent two display panels can be prevented, and brightness uniformity of the spliced display device 100 is improved.

Figure 3:
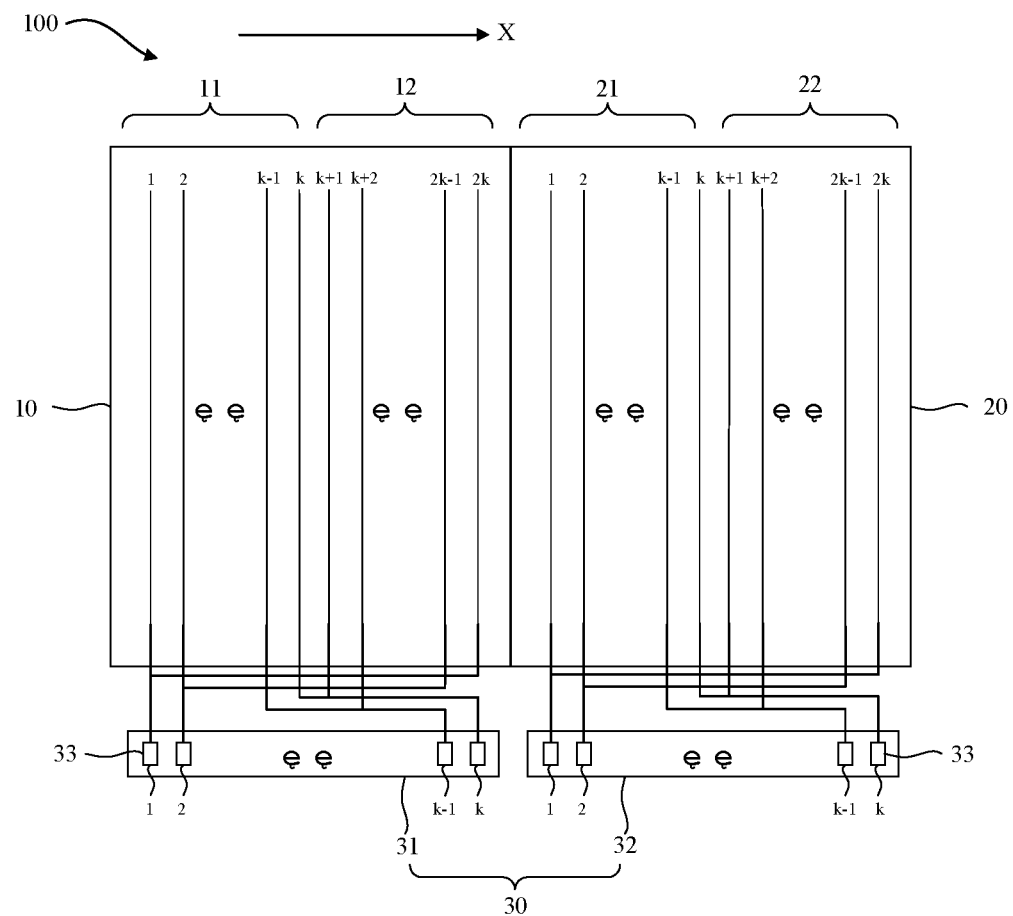
FIG. 3 is a structural view of a second type of a spliced display device of the present application.

Please refer to FIG. 3. Each of the first driver chip 31 and the second driver chip 32 includes k output terminals 33, and each of the output terminals 33 includes two of the output channels.

In this embodiment, the $2k-1^{th}$ output channels in the first driver area and the third driver area, and the $2k^{th}$ output channels in the second driver area and the fourth driver area are electrically connected to $k^{th}$ output terminals in the first and second driver chips.

A difference from the embodiment shown in FIG. 2 lies in that in the first driver chip 31 and the second driver chip 32, the first scan lines in the first display area 11 and the third display area 21 and the $2k^{th}$ scan lines in the second display area 12 and the fourth display area 22 concurrently receive scan signals output by the first output terminals of the first driver chip 31 and the second driver chip 32. Next, the second scan lines in the first display area 11 and the third display area 21 and the $2k-1^{th}$ scan lines in the second display area 12 and the fourth display area 22 concurrently receive scan signals output by the second output terminals of the first driver chip 31 and the second driver chip 32, and so on. In this embodiment, there is no time delay for the scan lines that first receive scan signals in each of the display areas, so that corresponding scan lines in adjacent display areas can receive corresponding scan signals at the same time, thereby improving brightness uniformity between adjoining areas of the adjacent two display areas.

Figure 4:
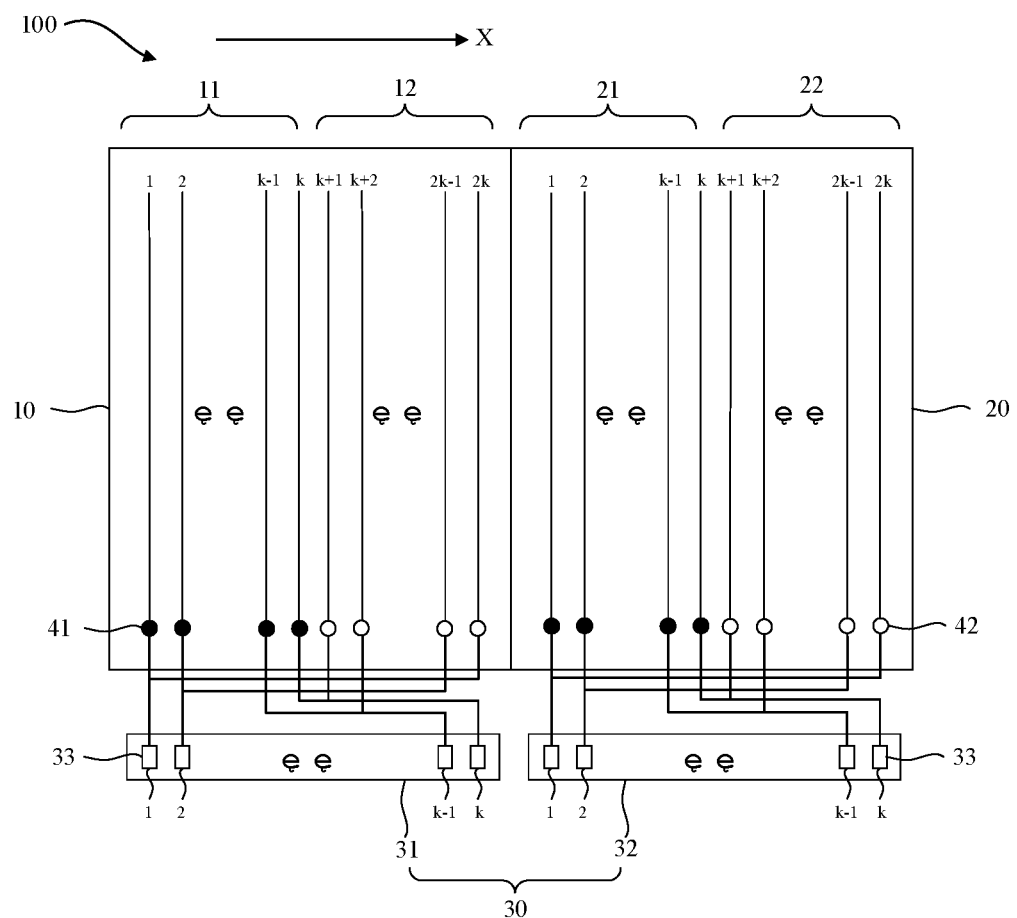
FIG. 4 is a structural view of a third type of a spliced display device of the present application.

Please refer to FIG. 4. The display device further includes a plurality of first switches 41 disposed on the first to $k^{th}$ scan lines, and a plurality of second switches 42 disposed on $k+1^{th}$ to $2k^{th}$ scan lines of the first display panel 10 and the second display panel 20.

When a scan signal is output from an $n^{th}$ terminal to a corresponding one of the scan lines, one of the first switches 41 corresponding to the $n^{th}$ terminal is closed, and one of the second switches 42 corresponding to the $n^{th}$ terminal is open, wherein $n^{th}$ scan lines of the first display panel 10 and the second display panel 20 receive the scan signals, and $2k+1-n^{th}$ scan lines are in a non-operation state.

After a predetermined period of time, the one of the first switches 41 corresponding to the $n^{th}$ terminal is open, and the one of the second switches 42 is closed, wherein the $n^{th}$ scan lines of the first display panel 10 and the second display panel 20 are in the non-operation state, and the $2k+1-n^{th}$ scan lines receive the scan signals, wherein $1 \leq n \leq k$, and n is a positive integer.

Based on the embodiment shown in FIG. 3, the first switches 41 are disposed in the first display area 11 and the third display area 21, and the second switches 42 are disposed in the second display area 12 and the fourth display area 22 in the present application. By controlling a time of receiving corresponding scan signals by different scan lines under control of opening or closed of the first switches 41 and the second switches 42, the present application can avoid crosstalk of scan signals and improve output accuracy of scan signals.

Figure 5:
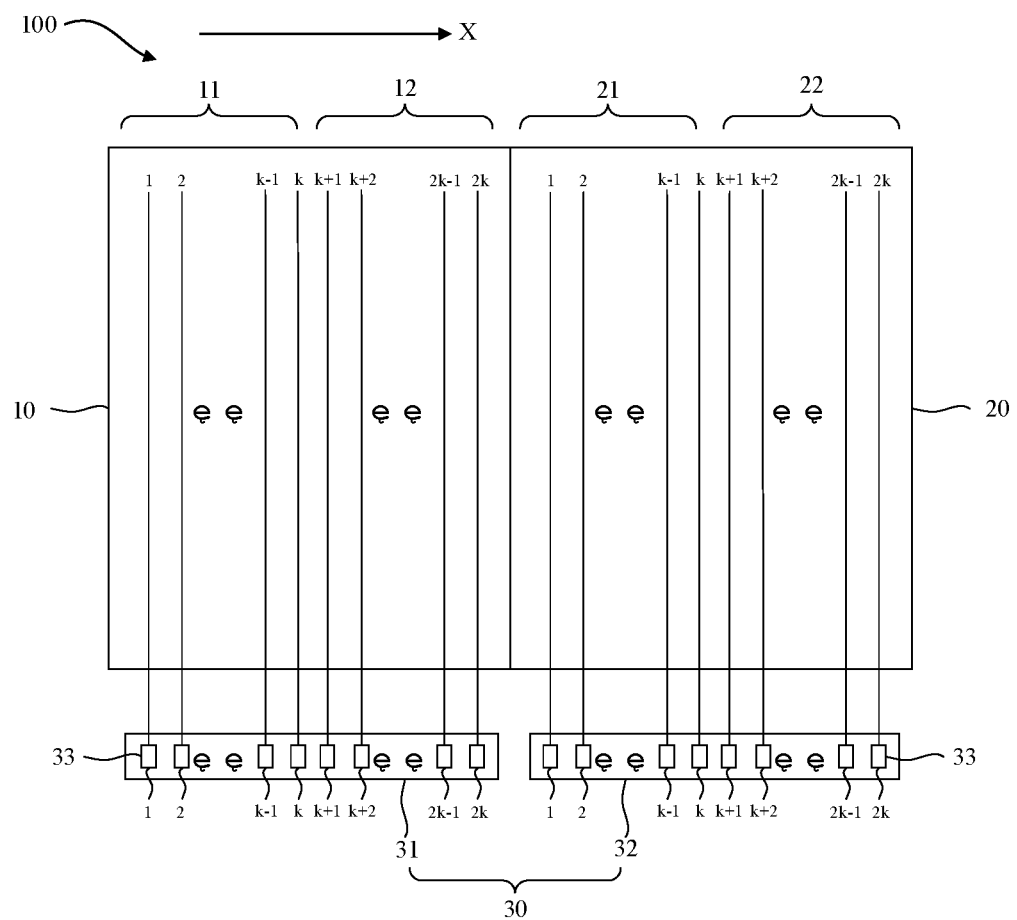
FIG. 5 is a structural view of a fourth type of a spliced display device of the present application.

Please refer to FIG. 5. The first driver area and the third driver area each include the first to $k^{th}$ output channels in the first driver chip 31, and the second driver area and the fourth driver area each include $k+1^{th}$ to $2k^{th}$ output channels in the first driver chip 31.

In this embodiment, the first to $k^{th}$ scan lines in the first display area 11 are electrically connected to the first to $k^{th}$ output channels in turn in the first driver area, the $k+1^{th}$ to $2k^{th}$ scan lines in the second display area 12 are electrically connected to the $k+1^{th}$ to $2k^{th}$ output channels in turn in the second driver area, the first to $k^{th}$ scan lines in the third display area 21 are electrically connected to the first to $k^{th}$ output channels in turn in the third driver area, and the $k+1^{th}$ to $2k^{th}$ scan lines in the fourth display area 22 are electrically connected to the $k+1^{th}$ to $2k^{th}$ output channels in turn in the fourth driver area.

For example, the display panel is configured to output first scan signals to the first to $k^{th}$ output channels, and to concurrently output second scan signals to the 2k to $k+1^{th}$ output channels. By adjusting an order of receiving the scan signals by the output channels in the second driver area, for example, the output terminals 33 in the first driver area correspondingly receive the first scan signals from left to right, and the output terminals 33 in the second driver area correspondingly receive the second scan signals from right to left, the present application enables the $2k^{th}$ scan line in the second display area 12 to receive the second scan signal output by the $2k^{th}$ output terminal 33 in the second driver area at the same time when the first scan line in the first display area 11 receive the first scan signal output by the first output terminal 33 in the first driver area. In addition, the $2k-1^{th}$ scan line in the second display area 12 concurrently receives the second scan signal output by the $2k-1^{th}$ output terminal 33 in the second driver area at the same time when the second scan line in the first display area 11 receive the first scan signal output by the second output terminal 33 in the first driver area, and so on. The above-mentioned technical solution achieves that the first display area 11 and the second display area 12 are scanned in directions facing each other.

Likewise, a method of connecting the second driver chip 32 to the second display panel 20 can refer to the above-mentioned connection method. A scanning method in each display area may be the same as the method implemented by scanning in the directions facing each other or facing away from each other as described above, and is not limited thereto in the present application.

Figure 6:
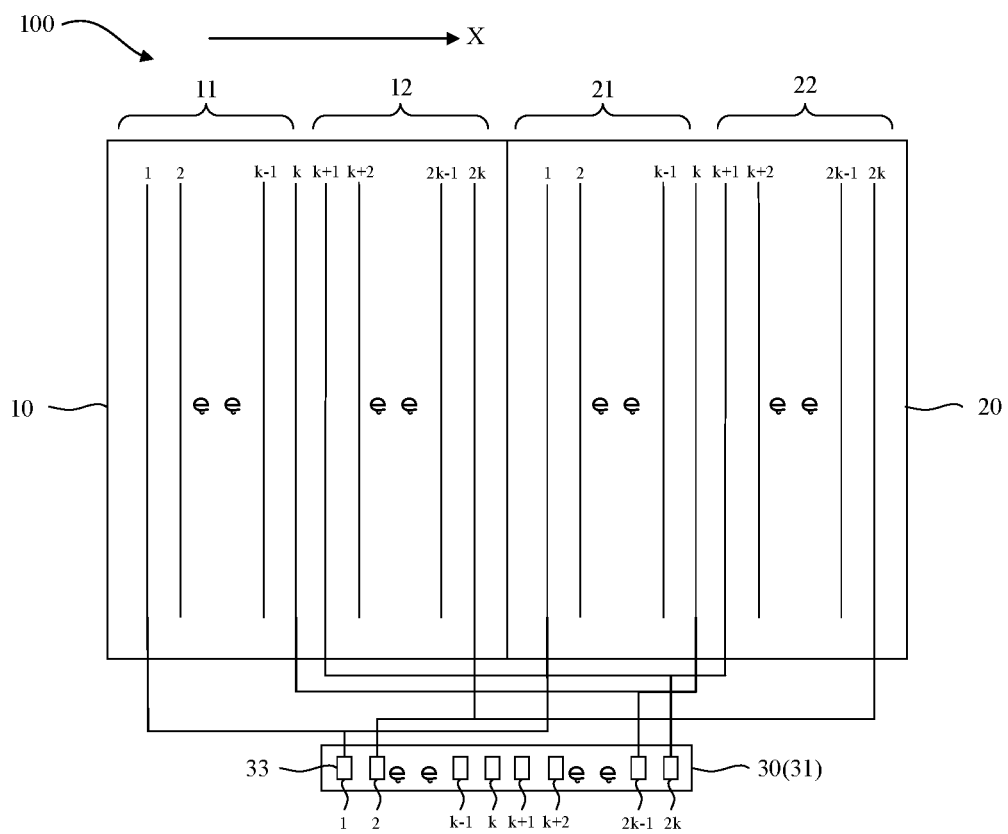
FIG. 6 is a structural view of a fifth type of a spliced display device of the present application.

Please refer to FIG. 6. Based on the above-mentioned embodiments, the driver device 30 includes a first driver chip 31 configured to control displaying of the first display panel 10 and the second display panel 20, wherein the first driver chip 31 includes 2k output terminals 33, and each of the output terminals 33 is connected to corresponding two of the scan lines.

Specifically, the output terminals 33 in the first driver area in the first driver chip 31 are correspondingly connected to the scan lines in the first display area 11 and the third display area 21. The output terminals 33 in the second driver area in the first driver chip 31 are correspondingly connected to the scan lines in the second display area 12 and the fourth display panel 22.

In this embodiment, the first to $k^{th}$ scan lines in the first display area 11 are correspondingly connected to the first to $2k-1^{th}$ output terminals 33 in turn in the first driver area, the $2k^{th}$ to $k+1^{th}$ scan lines in the second display area 12 are correspondingly connected to the $2^{nd}$ to $2k^{th}$ output terminals 33 in turn in the second driver area, the first to $k^{th}$ scan lines in the third display area 21 are correspondingly connected to the first to 2k−1 output terminals 33 in turn in the first driver area, and the $2k^{th}$ to $k+1^{th}$ scan lines in the fourth display area 22 are correspondingly connected to the $2^{nd}$ to $2k^{th}$ output terminals 33 in turn in the second driver area.

The disclosed embodiment of present application uses one terminal to connect scan lines disposed in display areas arranged at intervals for carrying out a first row scanning, and so on. In this manner, the present application achieves that adjacent display areas are scanned in directions facing or facing away from each other, thereby further reducing number of the output terminals of the driver device 30.

The present application provides a spliced display device including at least two display panels and a driver device configured to drive the display panels, wherein each of the display panels includes at least two display areas disposed side by side in a first direction. The present application uses the driver device to control any adjacent two of the display areas to be scanned in directions facing each other or facing away from each other, so that adjacent two of the display areas of the display panels spliced together are scanned in directions opposite to each other, and when the adjacent two display panels receive a same grayscale voltage, the display device has a maximum brightness area or a minimum brightness area located between the adjacent two of the display panels, thereby preventing brightness difference from occurring between adjoining areas of adjacent two display panels, and improving brightness uniformity of the spliced display device.

It can be understood that for those of ordinary skill in the art, equivalent replacements or changes can be made according to the technical solutions and inventive concepts of the present application, and all such changes or replacements should fall within the scope of the claims defined in the present application.

What is claimed is:

1. A spliced display device, comprising:
at least two display panels comprising a first display panel and a second display panel, and a driver device configured to drive the display panels, wherein the first display panel at least comprises a first display area and a second display area arranged side by side in a first direction, the second display panel at least comprising a third display area and a fourth display area arranged side by side in the first direction, the first display area and the third display area being scanned in a direction the same as that of the first direction, and the second display area and the fourth display area being scanned in a direction opposite to the first direction;
wherein any adjacent two of the first display area, the second display area, the third display area, and the fourth display area are configured to be scanned in directions facing each other or facing away from each other under control of the driver device, and adjacent two of the display panels provided with display areas spliced together and configured to be scanned in directions opposite to each other;
wherein each one of the first display panel and the second display panel comprises 2k scan lines, first to $k^{th}$ scan lines are disposed in a first region provided in the first display panel and the second display panel, $k+1^{th}$ to $2k^{th}$ scan lines are disposed in a second region provided in the first display panel and the second display panel;
wherein the first region is scanned in a direction from the first to $k^{th}$ scan lines, the second region is scanned in a direction from the $2k^{th}$ to $k+1^{th}$ scan lines, and k is a positive integer, wherein the first region is the first display area of the first display panel or is the third display area of the second display panel, and the second region is the second display area of the first display panel or is the fourth display area of the second display panel;

wherein the driver device comprises a first driver chip configured to control displaying of the first display panel, a second driver chip configured to control displaying of the second display panel, each of the first driver chip and the second driver chip comprising 2k output channels, and each of the output channels connected to a corresponding one of the scan lines;

wherein the output channels in a first driver area provided in the first driver chip are correspondingly connected to the scan lines in the first display area, the output channels in a second driver area provided in the first driver chip are correspondingly connected to the scan lines in the second display area, the output channels in a third driver area provided in the second driver chip are correspondingly connected to the scan lines in the third display area, and the output channels in a fourth driver area provided in the second driver chip are correspondingly connected to the scan lines in the fourth display area;

wherein the first driver area includes the first to $2k-1^{th}$ odd-numbered output channels in the first driver chip, the second driver area includes $2^{nd}$ to $2k^{th}$ even-numbered output channels in the first driver chip, the third driver area includes first to $2k-1^{th}$ odd-numbered output channels in the second driver chip, and the fourth driver area includes $2^{nd}$ to $2k^{th}$ even-numbered output channels in a second driver chip;

wherein the first to $k^{th}$ scan lines in the first display area are correspondingly connected to the first to $2k-1^{th}$ output channels in turn in the first driver chip, the $2k^{th}$ to $k+1^{th}$ scan lines in the second display area are correspondingly connected to the $2^{nd}$ to $2k^{th}$ output channels in turn in the second driver chip, the first to $k^{th}$ scan lines in the third display area are correspondingly connected to the first to $2k-1^{th}$ output channels in turn in the third driver chip, and the $2k^{th}$ to $k+1^{th}$ scan lines in the fourth display area are correspondingly connected to the $2^{nd}$ to $2k^{th}$ output channels in turn in the fourth driver chip; and wherein when adjacent two of the display panels receive a same grayscale voltage, the display device is provided with a maximum brightness area or a minimum brightness area located between the adjacent two of the display panels.

2. The spliced display device of claim 1, wherein each of the first driver chip and the second driver chip comprises k output terminals, and each of the output terminals comprises two of the output channels;

wherein the $2k-1^{th}$ output channels in the first driver area and the $2k^{th}$ output channels in the second driver area are electrically connected to $k^{th}$ output terminals in the first driver chip, and the $2k-1^{th}$ output channels in the third driver area and the $2k^{th}$ output channels in the fourth driver area are electrically connected to $k^{th}$ output terminals in the second driver chip.

3. The spliced display device of claim 2, wherein the display panel further comprises a plurality of first switches disposed on the first to $k^{th}$ scan lines, and a plurality of second switches disposed on $k+1^{th}$ to $2k^{th}$ scan lines of the first display panel and the second display panel;

wherein when a scan signal is output from an $n^{th}$ terminal to a corresponding one of the scan lines, one of the first switches corresponding to the $n^{th}$ terminal is closed, and one of the second switches corresponding to the $n^{th}$ terminal is open, wherein $n^{th}$ scan lines of the first display panel and the second display panel receive the scan signals, and $2k+1-n^{th}$ scan lines are in a non-operation state;

wherein after a predetermined period of time, the one of the first switches corresponding to the $n^{th}$ terminal is open, and the one of the second switches is closed, wherein the $n^{th}$ scan lines of the first display panel and the second display panel are in the non-operation state, and the $2k+1-n^{th}$ scan lines receive the scan signals, wherein $1 \leq n \leq k$, and n is a positive integer.

4. A spliced display device, comprising:

at least two display panels comprising a first display panel and a second display panel, and a driver device configured to drive the display panels, wherein the first display panel at least comprises a first display area and a second display area arranged side by side in a first direction, the second display panel at least comprising a third display area and a fourth display area arranged side by side in the first direction, the first display area and the third display area being scanned in a direction the same as that of the first direction, and the second display area and the fourth display area being scanned in a direction opposite to the first direction;

wherein any adjacent two of the first display area, the second display area, the third display area, and the fourth display area are configured to be scanned in directions facing each other or facing away from each other under control of the driver device, and adjacent two of the display panels provided with display areas spliced together and configured to be scanned in directions opposite to each other, and the first direction is parallel with a plurality of data lines provided in the display panel;

wherein each one of the first display panel and the second display panel comprises 2k scan lines, first to $k^{th}$ scan lines are disposed in a first region provided in the first display panel and the second display panel, $k+1^{th}$ to $2k^{th}$ scan lines are disposed in a second region provided in the first display panel and the second display panel;

wherein the first region is scanned in a direction from the first to $k^{th}$ scan lines, the second region is scanned in a direction from the $2k^{th}$ to $k+1^{th}$ scan lines, and k is a positive integer, wherein the first region is the first display area of the first display panel or is the third display area of the second display panel, and the second region is the second display area of the first display panel or is the fourth display area of the second display panel;

wherein the driver device comprises a first driver chip configured to control displaying of the first display panel, a second driver chip configured to control displaying of the second display panel, each of the first driver chip and the second driver chip comprising 2k output channels, and each of the output channels connected to a corresponding one of the scan lines;

wherein the output channels in a first driver area provided in the first driver chip are correspondingly connected to the scan lines in the first display area, the output channels in a second driver area provided in the first driver chip are correspondingly connected to the scan lines in the second display area, the output channels in a third driver area provided in the second driver chip are correspondingly connected to the scan lines in the third display area, and the output channels in a fourth driver area provided in the second driver chip are correspondingly connected to the scan lines in the fourth display area;

wherein the first driver area includes the first to $k^{th}$ output channels in the first driver chip, the second driver area includes $k+1^{th}$ to $2k^{th}$ output channels in the first driver chip, the third driver area includes first to $k^{th}$ output channels in the second driver chip, and the fourth driver area includes $k+1^{th}$ to $2k^{th}$ output channels in a second driver chip;

wherein the first to $k^{th}$ scan lines in the first display area are electrically connected to the first to $k^{th}$ output channels in turn in the first driver chip, the $k+1^{th}$ to $2k^{th}$ scan lines in the second display area are electrically connected to the $k+1^{th}$ to $2k^{th}$ output channels in turn in the second driver chip, the first to $k^{th}$ scan lines in the third display area are electrically connected to the first to $k^{th}$ output channels in turn in the third driver chip, and the $k+1^{th}$ to $2k^{th}$ scan lines in the fourth display area are electrically connected to the $k+1^{th}$ to $2k^{th}$ output channels in turn in the fourth driver chip;

wherein each of the display panels is configured to output first scan signals to the first to $k^{th}$ output channels in the first driver chip and the second driver chip, and to concurrently output second scan signals to the $2k$ to $k+1^{th}$ output channels in the first driver chip and the second driver chip;

wherein when adjacent two of the display panels receive a same grayscale voltage, the display device is provided with a maximum brightness area or a minimum brightness area located between the adjacent two of the display panels.

5. A spliced display device, comprising:

at least two display panels comprising a first display panel and a second display panel, and a driver device configured to drive the display panels, wherein the first display panel at least comprises a first display area and a second display area arranged side by side in a first direction, the second display panel at least comprising a third display area and a fourth display area arranged side by side in the first direction, the first display area and the third display area being scanned in a direction the same as that of the first direction, and the second display area and the fourth display area being scanned in a direction opposite to the first direction;

wherein any adjacent two of the first display area, the second display area, the third display area, and the fourth display area are configured to be scanned in directions facing each other or facing away from each other under control of the driver device, and adjacent two of the display panels provided with display areas spliced together and configured to be scanned in directions opposite to each other;

wherein each one of the first display panel and the second display panel comprises $2k$ scan lines, first to $k^{th}$ scan lines are disposed in a first region provided in the first display panel and the second display panel, $k+1^{th}$ to $2k^{th}$ scan lines are disposed in a second region provided in the first display panel and the second display panel;

wherein the first region is scanned in a direction from the first to $k^{th}$ scan lines, the second region is scanned in a direction from the $2k^{th}$ to $k+1^{th}$ scan lines, and k is a positive integer, wherein the first region is the first display area of the first display panel or is the third display area of the second display panel, and the second region is the second display area of the first display panel or is the fourth display area of the second display panel;

wherein the driver device comprises a first driver chip configured to control displaying of the first display panel and the second display panel, wherein the first driver chip comprises $2k$ output terminals, and each of the output terminals is connected to corresponding two of the scan lines;

wherein the output terminals in a first driver area provided in the first driver chip are correspondingly connected to the scan lines in the first display area and the third display area, and the output terminals in a second driver area provided in the first driver chip are correspondingly connected to the scan lines in the second display area and the fourth display panel; and wherein when adjacent two of the display panels receive a same grayscale voltage, the display device is provided with a maximum brightness area or a minimum brightness area located between the adjacent two of the display panels.

6. The spliced display device of claim 5, wherein the first to $k^{th}$ scan lines in the first display area are correspondingly connected to the first to $2k-1^{th}$ output terminals in turn in the first driver area, the $2k^{th}$ to $k+1^{th}$ scan lines in the second display area are correspondingly connected to the $2^{nd}$ to $2k^{th}$ output terminals in turn in the second driver area, the first to $k^{th}$ scan lines in the third display area are correspondingly connected to the first to $2k-1^{th}$ output terminals in turn in the first driver area, and the $2k^{th}$ to $k+1^{th}$ scan lines in the fourth display area are correspondingly connected to the $2^{nd}$ to $2k^{th}$ output terminals in turn in the second driver area.

\* \* \* \* \*